(12) United States Patent
Pannier et al.

(10) Patent No.: US 8,524,627 B2
(45) Date of Patent: Sep. 3, 2013

(54) ACTIVATING SUPPORTS WITH CONTROLLED DISTRIBUTION OF OH GROUPS

(75) Inventors: Gaëlle Pannier, Brussels (BE); Christophe Boisson, Tramoyes (FR); Roger Spitz, Lyons (FR)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 13/318,547

(22) PCT Filed: Apr. 29, 2010

(86) PCT No.: PCT/EP2010/055797
§ 371 (c)(1),
(2), (4) Date: Jan. 13, 2012

(87) PCT Pub. No.: WO2010/127988
PCT Pub. Date: Nov. 11, 2010

(65) Prior Publication Data
US 2012/0101239 A1    Apr. 26, 2012

(30) Foreign Application Priority Data

May 7, 2009    (EP) .................................... 09290333

(51) Int. Cl.
*C08F 4/02*    (2006.01)
*C08F 4/653*   (2006.01)
*C08F 4/6592*  (2006.01)

(52) U.S. Cl.
USPC ........... 502/120; 502/103; 502/104; 502/113; 502/129; 502/152; 502/514; 526/113; 526/129; 526/144; 526/160; 526/943

(58) Field of Classification Search
USPC ................. 502/103, 104, 120, 129, 152, 514; 526/113, 129, 144, 160, 943
See application file for complete search history.

(56) References Cited

U.S. PATENT DOCUMENTS

| 6,548,442 B1 | 4/2003 | McDaniel et al. |
| 2009/0042720 A1 | 2/2009 | Prades et al. |

OTHER PUBLICATIONS

Sommer, Gieseman, Ulbricht: "Ethylen-Polymerisation mit tragerfixierten Organmetallverbindungen" [Ethylene ploymerization using supported organometallic compounds] Acta Polymerica, 35, No. 4, I, 1984, pp. 253-256.
Franck Rataboul et al., Molecular Understanding of the Formation of Surface Zirconium Hydrides upon Thermal Treatment under Hydrogen of [SiO]Zr(CH2tBu)3] by Using Advanced Solid-State NMR Techniques, J.Am.Chem.Soc, vol. 126, No. 39, pp. 12541-12550.

*Primary Examiner* — Caixia Lu

(57) ABSTRACT

The present invention relates to a process for preparing an activating support for metallocene complexes in the polymerization of olefins comprising the steps of:
  I) providing a support consisting in particles formed from at least one porous mineral oxide;
  II) optionally fixing the rate of silanols on the surface of the support;
  III) functionalizing the support with a solution containing a metallic salt;
  IV) heating the functionalized support of step c) under an inert gas or hydrogen;
  V) oxidizing the support of step IV by treatment under $N_2O$ and then under oxygen;
  VI) retrieving an active support having a controlled number of OH groups.

That activating support is used to activate a metallocene catalyst component for the polymerization of olefins.

13 Claims, No Drawings

ACTIVATING SUPPORTS WITH CONTROLLED DISTRIBUTION OF OH GROUPS

CROSS-REFERENCE TO RELATED APPLICATIONS

This application claims the benefit of PCT/EP2010/055797, filed Apr. 29, 2010, which claims priority from EP 09290333.5, filed May 7, 2009.

This invention relates to the field of activation of metallocene complexes, particularly in heterogeneous catalysis, to their method of preparation and to their use in the polymerisation of olefins.

The polymerisation of olefins in the presence of metallocene complexes has mostly been described in homogeneous catalysis. In that type of polymerisation, the catalyst, the olefin monomer and the resulting polymer are all present in the same liquid phase, typically a solvent.

These catalysts are however not adapted to heterogeneous polymerisation, such as suspension or gas phase polymerisation. These processes offer many advantages, among others, they allow the preparation of a polymer in granular form having a defined particles size distribution.

It is known in the art to (co)polymerise ethylene and alpha-olefins in the presence of a catalyst system comprising a metallocene catalyst component and an activating agent. As disclosed in Chen (Chen E, *Chem. Rev.*, 2000, 100, 1391) homogeneous activating agents range from simple aluminiumalkyls such as diethylaluminium chloride with $Cp_2TiCl_2$, to methylaluminoxane (MAO) alone or modified, to perfluoroarylboranes, perfluoroarylalanes, perfluoroarylborates and perfluoroarylaluminates in combination with alkylating agents such as triisobutylaluminium.

These activators are costly, unstable and produce polymers that have a poor morphology, therefore incompatible with high yield processes in suspension or gas phase polymerisation. The catalytic system, i.e. the metallocene complex and its activator, must be supported on a solid support in order to be used in these polymerisation processes.

The most typical technique is to support onto solid supports, homogeneous activators such as MAO as described for example by Chien (*J. Polym. Sci, Part A: Pol. Chem.*, 1991, 29, 1603.), or by Collins (*Macromolecules*, 1992, 25, 1780), or by Saga (*Makromol. Chem.*, 1993, 194, 1745) or by Kaminsky (*Makromol. Chem. Rapid Commun.*, 1993, 14, 239) or such as perfluoroarylborates as described for example in U.S. Pat. No. 5,643,847 or such as perfluoroarylaluminates.

Polymers obtained with these systems have regular grain size and have high apparent densities, thereby decreasing reactor fouling when compared to homogeneous polymerisation.

These catalytic systems using supported homogeneous activators are less active than equivalent homogeneous systems and the polymer properties may be degraded.

A new generation of solid activating supports has been developed and is described for example in Marks (*J. Am. Chem. Soc.*, 1998, 120, 13533): it concerns sulfated zircone particles or also by McDaniel (WO-9960033, WO-0123433, WO-0123434, WO-0144309, WO-0149747 et U.S. Pat. No. 6,548,441) or by Saudemont (FR-A-2765225). All these activators are solids having surface acid sites that are responsible for the activation.

These acid sites are metals combined with halides such as fluorine or chlorine; metals can be selected from aluminium, titanium, zirconium or nickel.

Equivalent species in homogeneous catalysis are very poor activators.

Compounds such as dimethylaluminium fluoride (DMF) are used as activators in combination with triethylaluminium for the stereospecific polymerisation of propylene with compounds of the metallocene family with low productivity as described by Zambelli (*Macromolecules* 1989, 22, 2186). They are thus very poor activators.

Patent application WO-0123433 claims a tri-component catalytic system comprising a compound of the metallocene family, an organoaluminium and a fluorinated silica-alumina acting as activator and obtained from a silica-alumina and a fluorinating agent. The surface acid sites are fluorine and aluminium. The drawback of this invention resides in the site definition and in the use of a fluorinating agent.

Patent FR-A-2769245 also claims a tri-component system comprising a compound of the metallocene family pre-alkylated or not pre-alkylated, a co-catalyst that can be selected from alkylaluminium or oligomeric cyclic alkyl aluminoxane and a solid activating support having surface aluminium or magnesium acid sites of formula:

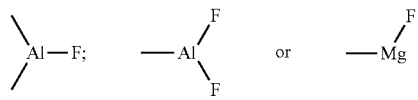

The method for preparing these supports comprises the steps of:
a) functionalisation of a porous mineral oxide with a functionalising agent based on aluminium and/or magnesium that reacts with the OH groups on the surface of the support;
b) optionally, thermal treatment under inert gas in a fluidised bed followed by a thermal treatment under oxygen;
c) fluorination with a fluorinating agent of the type $(NH_4)_2SiF_6$.

The preparation of the supports involved several steps: it was long and required a separate fluorination step. In addition, in some cases, especially when the thermal treatment had been omitted, it was necessary to use activating agents such as MAO in order to reach an acceptable activity. The use of MAO is detrimental to the morphology of the final polymer.

WO2005/075525 has also disclosed a new fluorinated activating support wherein the functionalising and fluorination reactions are carried out in a single step. The support becomes an activating support after two thermal treatments: pyrolysis and combustion.

There is thus a need to develop activating supports, wherein the localisation on the surface is well defined as it is in FR-A-2769245 but with a reduced number of steps and wherein the activity is sufficient to suppress the need for an homogeneous activating agent such as methylaluminoxane (MAO) that degrades the polymer morphology.

It is an aim of the present invention to prepare activating supports having acid sites and that are easy to produce.

It is also aim of the present invention to disclose active catalyst systems that do not require the use of an activating agent such as MAO and have an activity and productivity comparable to those of homogeneous systems.

It is another aim of the present invention to provide polymers having excellent polymer morphology.

It is yet another aim of the present invention to decrease reactor fouling.

Any one of these aims is, at least partially, fulfilled by the present invention.

Accordingly, the present invention discloses a method for preparing an activating support that comprises the steps of:
a) providing a support consisting of particles formed from at least one porous mineral oxide;
b) deshydroxylating the support of step a) by thermal treatment;
c) functionalising the support with a solution containing a metallic salt of formula $MR_nX_{v-n}$ wherein M is a metal group 3 or 4 of the Periodic Table, v is the valence of M, n is zero or an integer of at most v, R is an hydrocarbyl group having from 1 to 20 carbon atoms and X is a halogen;
d) forming supported metal-hydride derivatives by thermal treatment of the support of step c) at a temperature of at least 250° C. under inert gas or by reaction of hydrogen with the support of step c).
e) oxidising the support in order to create OH sites by treatment with excess $N_2O$ at room temperature;

The porous mineral oxides of step a) are advantageously chosen from silica, alumina and mixtures thereof, preferably, it is silica.

The porous mineral oxide particles preferably have at least one of the following characteristics:
they include pores having a diameter ranging from 7.5 to 30 nm;
they have a porosity ranging from 1 to 4 $cm^3/g$;
they have a specific surface area ranging from 100 to 1000 $m^2/g$; and
they have an average diameter ranging from 1 to 100 μm.

Before it is functionalised, the support is deshydroxylated in step b). It has —OH radicals on its surface, in particular from 0.25 to 10, and even more preferably from 0.5 to 4 —OH radicals, per $nm^2$ resulting from a thermal treatment. These acid sites will be functionalised in step c).

The support may be of various kinds. Depending on its nature, its state of hydration and its ability to retain water, the dehydration treatments may be of greater or lesser intensity as a function of the desired surface content of —OH radicals.

Those skilled in the art may determine, by routine tests, the dehydration treatment that should be applied to the support that they have chosen, depending on the desired surface content of —OH radicals.

More preferably, the starting support is made of silica. Typically, the silica may be heated between 100 and 1000° C., preferably between 120 and 800° C., more preferably between 140 and 700° C., under an inert gas atmosphere, such as for example under nitrogen or argon, at atmospheric pressure or under a vacuum of about $10^{-5}$ bars, for a period of time of at least 60 minutes.

Alternatively, the heat treatment can be carried out at a temperature of from 100 to 450° C., and followed by a silanisation treatment. Such treatment results in a species derived from silicon being grafted on the surface of the support thereby making said surface more hydrophobic.

The silane may, for example, be an alkoxytrialkylsilane, such as for example methoxytrimethylsilane, or a trialkylchlorosilane, such as for example trimethylchlorosilane or triethylchlorosilane. It is typically applied to the support by forming a suspension of this support in an organic silane solution, said silane solution having a concentration of between 0.1 and 10 mol per mole of OH radicals on the support. The solvent for this solution may be chosen from linear or branched aliphatic hydrocarbons, such as hexane or heptane, alicyclic hydrocarbons, optionally substituted, such as cyclohexane, and aromatic hydrocarbons, such as toluene, benzene or xylene. The treatment of the support by the silane solution is generally carried out under stirring at a temperature of from 50 to 150° C., during 1 to 48 hours.

After silanisation, the solvent is typically removed by siphoning or by filtration, and the support is then washed thoroughly, using for example 0.3 L of solvent per gram of support.

In a preferred embodiment according to the present invention, functionalisation of step c) is carried out with $ZrR_4$, wherein the amount of zirconium is of at most ⅓ that of silanol groups present on the silica surface and wherein R is hydrocarbyl having up to 20 carbon atoms, preferably substituted alkyl, most preferably $CH_2Ph$.

In another preferred embodiment according to the present invention, the functionalising agent is also a fluorinating agent. Fluorinated acid sites are thus formed by reaction of —OH radicals carried by the support base particles with at least one functionalisation agent chosen from:
compounds comprising at least one aluminium, one fluorine and one organic group that can react with the OH— groups. The organic group is preferably an hydrocarbon and most preferably an alkyl group having from 1 to 12 carbon atoms;
optionally in combination with any one or more compounds selected from MF, $MR^2$, $M'F_2$, $M'R^2F$, or $M'R^2_2$ wherein M is a group 1 metal of the Periodic Table (Handbook of Chemistry and Physics, 76th edition), M' is a group 2 metal of the Periodic Table and $R^2$ is an alkyl having from 1 to 20 carbon atoms.

Preferably, the fluorinated functionalisation agent is $Al(R^1)_2F$ wherein the $R^1$ groups, can be the same or different and are linear or branched alkyl groups having from 1 to 20 carbon atoms. Preferably, $R^1$ is methyl, ethyl, butyl and hexyl, and more preferably the $R^1$ groups are the same.

The functionalising and fluorinating agents may be prepared as disclosed for example in Ziegler et al. (*Liebigs Ann. Chem.* 1954, 608, 1) or in patents DE-A-1102151 and DE-A-1116660.

The most preferred functionalising/fluorinating agent is diethylaluminiumfluoride (DEAF).

The functionalisation/fluorinating agent can be used alone or in combination with any one or more groups selected from MF, $MR^2$, $M'F_2$, $M'R^2F$ or $MlR^2_2$ wherein M is a group 1 metal, preferably Na, M' is a group 2 metal, preferably Mg and $R^2$ is an alkyl group having from 1 to 20 carbon atoms.

In a preferred embodiment of the present invention, the functionalisation step is carried out by treating a suspension of the support particles in a solvent medium containing the functionalisation and fluorinating agent at a temperature ranging from −150 to +150° C. for a period of time ranging from 1 to 12 hours, and then by recovering the grafted particles after washing. The solvent is preferably selected from aliphatic, alicyclic and aromatic hydrocarbons. Preferably, the treatment is carried out at a temperature of from 20 to 100° C. and for a period of time of from 1 to 3 hours. Preferably the concentration of functionalisation and fluorinating agent is of from 0.5 to 20 mmol per g of support particles.

In the present invention, the thermal treatments described here-below are necessary to create a support having a sufficient level of acidity to activate the metallocene complex.

Before the functionalisation treatment, especially if said treatment is carried out with DEAF, silica is preferably treated with $SiMe_3Cl$ in order to boost the activity of the catalyst system.

After the functionalisation step, a thermal treatment under an inert gas such as argon or nitrogen is performed. Alternatively and preferably a hydrogenation treatment under $H_2$ is performed. In both cases, the aim is to obtain metal hydride derivatives. These treatments are done at a temperature ranging between 200° C. and 600° C., preferably at a temperature of about 300° C. and for a period of time of 1 hour to 2 days, preferably 1 to 2 hours.

The treatment is carried out in a fluidised bed. The partially deshydroxylated silica is first functionalised. The functionalised silica is then further treated in order to obtain a metal-H bond:
either by β-H elimination with a treatment under inert gas such as argon or nitrogen at a temperature of about 300° C.;
or by hydrogenation under $H_2$ at a temperature of about 300° C.,
for a period of time ranging between 1 and 2 hours.

The fluidised bed is protected from light in order to avoid destruction of the metal-H bond, which is very fragile.

The present thermal treatment, carried out after the fluorination step, aims at preparing a surface hydride which will later be oxidised into an hydroxy.

A treatment under $N_2O$ is carried out in step e) in order to oxidise M-H bonds into M-OH bonds in a controlled manner.

Hillhouse et al (J. Am. Chem. Soc. 1987, 109, 5528) report that $N_2O$ can be used to selective oxidise hafnium hydride complexes into hydoxy derivatives. The formation of hafnium complexes bearing OH groups by treatment with $N_2O$ is disclosed in the following scheme $$Cp_2HfH_2 \rightarrow (under\ N_2O\ at\ -78°\ C.) \rightarrow N_2 + Cp_2HfHOH \rightarrow (under\ excess\ N_2O\ at\ +80°\ C.) \rightarrow N_2 + Cp_2Hf(OH)_2$$

Such reaction scheme is particularly desirable as the only by-product is $N_2$ which is eliminated from the reaction medium.

Similarly, Rataboul et al (J. Am. Chem. Soc. 2004, 126, 12541) have disclosed the oxidation of zirconium hydride present on silica by treatment with $N_2O$ in order to yield surface ZrOH groups.

In the present invention, it is desired to use $N_2O$ in order to control the creation of OH sites on the silica surface. Such OH groups created on the silica surface result in Brönsted acidity necessary for activating metallocene and post-metallocene catalyst components.

The oxidation treatment is carried out by submitting the support to a flow of $N_2O$. The reaction is typically carried out at room temperature, under a flow of $N_2O$ of about 20 mL/min and for a period of time of about 2 hours.

The amount of aluminium and fluorine present in the support at the end of the treatment are respectively of 0.5 to 7 wt %, preferably of from 1 to 5 wt % for the aluminium and of 0.2 to 5 wt %, preferably of from 0.5 to 3 wt % for the fluorine. The amount of zirconium present in the support at the end of the treatment is of 0.2 to 7 wt %, preferably of from 0.5 to 5 wt %.

When the functionalising agent acts at the same time as a fluorinating agent, the activating supports of the present invention are characterised in that each fluorine atom is directly linked to a metal atom (for example an aluminium atom) and the distribution of fluorine on the surface of the support is uniform. This is different from the situation disclosed in FR-A-2769245 wherein the fluorine occurs in various combinations such as for example liked to Al, or directly linked to the surface Si as Si—F or as Si—OSiF$_3$, or as Al—OSiF$_3$.

The present invention further relates to a supported metallocene catalyst system for the polymerisation of olefins, comprising:

(a) a metallocene catalyst component that is optionally pre-alkylated;
(b) optionally an alkylating agent; and
(c) an activating solid support for metallocene, prepared by the process as defined above, wherein the metallocene catalyst component is impregnated on the activating support before or after the optional alkylation treatment.

The counter anion of the active cationic complex may be constituted of a solid support preferably having a defined and controlled structure such as that of supports used in Ziegler-Natta catalysis. In order to enable the physical development of polymerisation, said support is functionalised in order to create surface acid sites that can effectively activate the metallocene complex.

The alkylating agent may be absent if the metallocene complex has been pre-alkylated. The support may be impregnated before or after the optional pre-alkylation treatment.

Components (a), (b) and (c) may be introduced in any order that depends upon the subsequent polymerisation process.

The activating support of the present invention is used to activate metallocene catalyst components and post-metallocene catalyst components that are susceptible to form cationic complexes in the presence of such activators. The preferred metallocene catalyst components are of general formula (I)

$$(CpR_m)R''_s(C'pR'_n)MQ_2 \qquad (I)$$

wherein Cp and C'p are independently selected from cyclopentadienyl, indenyl or fluorenyl, substituted or unsubstituted;
wherein R and R' are independently selected from hydrocarbyl having from 1 to 20 carbon atoms;
wherein s is zero if the bridge is absent and 1 if the bridge is present;
wherein m and n are integers representing the number of substituents;
wherein R'' is a structural bridge imparting stereorigidity to the compound;
wherein M is a metal Group 4 of the Periodic Table, selected from Ti, Zr or Hf; and
wherein Q is halogen or alkyl having from 1 to 6 carbon atoms.

The activating supports of the present invention may also activate constrained geometry catalyst components of formula (II)

$$(CpR_m)R''_s(YR'_n)MQ_2$$

wherein Y is a heteroatom. Preferably, Y is N, O or P. More preferably, it is N.

Preferably, the bridge is present. It may be an alkylene radical, such as a methylene radical (—CR$_2$—), an ethylene radical (—CH$_2$CH$_2$—) or a trimethylene radical (—CH$_2$—CH$_2$—CH$_2$—), said alkylene radical being unsubstituted or substituted, for example by at least one hydrocarbon group, such as for example the isopropylidene radical; it may also be a silylene (—SiH$_2$) group, optionally substituted, for example by at least one hydrocarbon group. One can cite a dialkylsilylene radical such as for example dimethylsilylene, a diarylsilylene radical such as for example diphenylsilylene or an alkylarylsilylene radical such as for example methylphenylsilylene.

Preferably, Q is chlorine or methyl.

By way of example, the metallocene catalyst may be chosen from the following compounds:
bis(n-butylcyclopentadienyl)zirconium dichloride [(n-but-Cp)$_2$ZrCl$_2$];

ethylenebis(4,5,6,7-tetrahydro-1-indenyl)zirconium dichloride [Et(THl)$_2$ZrCl$_2$];
ethylenebis(indenyl)zirconium dichloride [Et(Ind)$_2$ZrCl$_2$];
isopropylidene(cyclopentadienyl-fluorenyl)zirconium dichloride [iPr(Cp)(Flu)ZrCl$_2$];
isopropylidenebis(tert-butyl-cyclopentadienyl)zirconium dichloride [iPr(t-Bu-Cp)$_2$ZrCl$_2$];
dimethylsilyl(3-tert-butyl-cyclopentadienyl-fluorenyl)zirconium dichloride [Me$_2$Si(3-t-Bu-Cp-Flu)ZrCl$_2$];
dimethylsilyl-bisindenyl-zirconium dichloride [Me$_2$Si(Ind)$_2$ZrCl$_2$];
ethylenebis(4,5,6,7-tetrahydro-1-indenyl)dimethylzirconium [Et(THl)$_2$ZrMe$_2$];
ethylenebis(indenyl)dimethylzirconium [Et(Ind)$_2$ZrMe$_2$];
isopropylidene(cyclopentadienyl-fluorenyl)dimethylzirconium [iPr(Cp-Flu) ZrMe$_2$];
dimethylsilyl(3-tert-butylcyclopentadienyl-fluorenyl)dimethylzirconium [Me$_2$Si(3-t-Bu-Cp-Flu) ZrMe$_2$];
dimethylsilyl(tetramethylcyclopentadienyl-tert-butylamino) zirconium dichloride [Me$_2$Si(Me$_4$-Cp-t-but-N)ZrCl$_2$];
dimethylsilyl(tetramethylcyclopentadienyl, tert-butylamino) dimethyltitanium, [Me$_2$Si(Me$_4$-Cp-t-but-N)TiMe$_2$;
ethylenebis(4,5,6,7-tetrahydro-1-indanyl)dimethyltitanium [Et(THl)$_2$ TiMe$_2$];
ethylenebis(indenyl)dimethyltitanium [Et(Ind)$_2$TiMe$_2$];
isopropylidene(cyclopentadienyl, fluorenyl)dimethyltitanium [iPr(Cp-Flu) TiMe$_2$];
dimethylsilyl(3-tert-butyl,5-methyl-cylopentadienyl-fluorenyl) zirconium dichloride [Me$_2$Si(3-t-Bu,5-Me-Cp-Flu) ZrCl$_2$];
Isopropylidene(3-tert-butyl,5-methyl-cylopentadienyl-3,6-tert-butyl-fluorenyl) zirconium dichloride [iPr(3-t-Bu,5-Me-Cp-3,6-t-Bu-Flu) ZrCl$_2$];
dimethylsilyl(tetramethylcyclopentadienyl, tert-butylamino) titanium dichloride [Me$_2$Si(Me$_4$-Cp-t-Bu-N)TiCl$_2$].

The activating support of the present invention may further activate all kinds of non-metallocene precursors of transition metals as described in Gibson et al. (Chem. Rev. 2003, 103, 283). In a preferred embodiment, transition metals are selected from Ti, Zr, Hf, Fe, Co, Ni and Pd.

The alkylating agent is an organometallic compound or a mixture thereof that is able to transform a metal-L group bond into a metal-carbon bond or a metal-hydrogen bond. It can be selected from an alkylated derivative of Al, Li or Mg or Zn. Preferably, it is selected from an alkylated derivative of aluminium of formula (III)

$$AlR^5{}_n X_{3-n} \quad (III)$$

wherein the R$^5$ groups, may be the same or different, and are a substituted or unsubstituted alkyl, containing from 1 to 12 carbon atoms such as for example ethyl, isobutyl, n-hexyl and n-octyl, X is a halogen or hydrogen and n is an integer from 1 to 3, with the restriction that at least one R$^5$ group is an alkyl. It can also be any organometallic compound able to create a metal-carbon bond provided it does not interfere with the activity of the final catalytic system.

Preferably, the alkylating agent is an aluminium alkyl, and more preferably it is triisobutylaluminium (TIBAL) or triethylaluminium (TEAL).

In the final supported metallocene catalytic system, the amounts of alkylating agent and of metallocene complex are such that the molar ratio Al/M is of from 1 to 10000 and the amount of activating support is of 0.01 to 2000 mg of support per micromole of metallocene complex.

One of the main advantages of the present invention is that it does not require the use of aluminoxane in order to activate the metallocene component and thereby avoids the drawbacks of danger and polymer morphology associated with the use of aluminoxane.

The present invention also discloses a method for homo- or co-polymerising ethylene and alpha-olefins that comprises the steps of:
a) injecting the activating support described here-above into the reactor;
b) injecting a solution of the catalyst component into the reactor;
c) optionally adding a scavenger/alkylating agent to the reactor;
d) optionally, adding the comonomer to the reactor,
e) adding the monomer and heating the reactor to a temperature of from 60 to 100° C.;
f) maintaining under polymerisation conditions;
g) desactivating the reactor and retrieving the polymer.

The metallocene catalyst component may be pre-impregnated on the activator support. This pre-impregnation may be carried out as follows.

The activating support is suspended, with the metallocene, in a solvent chosen from aliphatic, alicyclic or aromatic hydrocarbons. The reaction is carried out at a temperature of from 0 to 140° C. for a period of from 1 hour to 10 hours. The amount of metallocene component is of from 0.01 to 20 wt % based on the total weight of the activating support. The mixture is decanted in order to remove the supernatant liquid. The support is then washed several times, at a temperature of from 20 to 140° C. with a quantity of solvent of from 20 to 300 ml per gram of support.

If the metallocene component (a) is a halogenated component it must be subjected to an alkylation treatment to transform it into an alkylated component. If the activating support is pre-impregnated with the metallocene component (a), this alkylation treatment may take place either before or after the pre-impregnation.

The present invention relates to a process for homopolymerising or copolymerising olefins, in suspension or in condensed phase or in the gas phase, in the presence of the supported metallocene catalyst system defined hereabove.

The olefins that can be homo- or co-polymerised with the catalyst system according to the present invention are, for example, the olefins containing from two to twenty carbon atoms and, preferably alpha.-olefins of this group. More preferably ethylene, propylene, 1-butene, 4-methyl-1-pentene, 1-octene, 1-hexene, 3-methyl-1-pentene, 3-methyl-1-butene, 1-decene and 1-tetradecene, or mixtures thereof can be used. Most preferably, the monomer is ethylene or propylene and the comonomer is propylene, 1-butene or 1-hexene or 1-octene.

The polymerisation processes may involve a chain-transfer agent to control the melt flow index of the polymer to be produced. Hydrogen is typically used as the chain-transfer agent, and it is introduced in an amount that can range up to 20 mole % and preferably ranges from 0.01 to 10 mole % in terms of total moles of the olefin/hydrogen combination injected into the reactor.

The supported catalytic systems according to the present invention offer number of advantages.
- The catalytic system has high activity and productivity that compare favourably with those obtained in homogeneous catalysis but they do not require activation agents such as MAO or perfluoroarylboranes or perfluoroarylborates in combination with alkylaluminium.
- The polymers obtained according to the present invention have a number average molecular weight Mn, a weight average molecular weight Mw and a polydispersity index PDI defined as the ratio Mw/Mn that are comparable to those obtained in homogeneous metallocene catalysis. The polydispersity index is of less than 5, preferably of from 2 to 4.

The polymers obtained according to the present invention are characterised by an isocomposition and a homogeneous distribution of comonomer chains, comparable to those obtained in homogeneous metallocene catalysis.

The iso- or syndio-specific polymerisation of alpha-olefins such as propylene with metallocene complexes having respectively a $C_2$ or $C_s$ symmetry are not affected by the presence of the activating support: they are comparable to those obtained in homogeneous metallocene catalysis.

The polymers obtained according to the present invention are under the form of very full regular grains having a high apparent density. Such excellent morphology was impossible to obtain with the prior art metallocene catalyst systems using methylaluminoxane as activating agent. In order to further improve and control the morphology of the final polymer, it is recommended to carry out a pre-polymerisation in suspension or preferably in gas phase and then introduce the pre-polymer particles in the selected (co)polymerisation process. The level of pre-polymerisation depends upon the subsequent polymerisation process.

The catalytic system according to the present invention excludes the use of MAO. The activating supports are thus stable and can be stored for very long periods of time.

Reactor fouling is substantially reduced because the polymer particles have controlled morphology.

The invention will now be illustrated by way of examples that do not limit its scope.

EXAMPLES

All the examples were carried out under argon using the classical Schlenk techniques. The solvents heptane and toluene were dried on a 3 angström molecular sieve.

In these examples, the number average molecular weight Mn, the weight average molecular weight Mw and the polydispersity index PDI=Mw/Mn were determined by Steric Exclusion Chromatography (SEC) with trichlorobenzene (TCB) as solvent at a temperature of 150° C. The system was calibrated with polystyrene standards using universal calibration.

Tacticity and comonomer incorporation were determined by $^{13}$CNMR analysis that was carried out on Varian 300 MHz equipment with a mixture 5:1 of trichlorobenzene/deuterobenzene, at a temperature of 135° C.

Productivities were expressed in grams of (co)polymer per gram of catalyst wherein the mass of the catalyst includes the mass of the activating support and that of the metallocene compound.

Examples 1 to 3

Preparation of Activating Supports SI, SII and SIII

The activating supports of the present invention were prepared as follows.

A silica support sold by Crossfield under the name ES70X was used as starting material. It had the following specifications:
specific surface area=276 m$^2$/g.
mean particle size=53 μm;
porous volume=1.54 mL/g;
apparent density=0.224 g/cm$^3$

Example 1

Synthesis of Support SI 1.8 mL of a solution of AlEt$_2$F (1.44 mol/L in isopar) were added on 2.02 g of silica in suspension in heptane (Crossfield ES70X, partially dehydroxylised by heating at a temperature of 450° C. under vacuum). This mixture was stirred during one hour at a temperature of 20° C. The support was then washed three times with heptane, and dried under vacuum. The support was then treated in a fluidised bed under argon and protected from UV radiation according to the following temperature program:
Heated from 30 to 100° C. in one hour;
Heated from 100 to 130° C. in thirty minutes;
Heated from 130 to 300° C. in one hour;
Maintained at a temperature of 300° C. during four hours
The support was then treated in the same fluidised bed with a 20 mL/min N$_2$O flow, in order to obtain an excess of 80 equivalents versus Al—H, at a temperature of 20° C., during a period of time of two hours. The resulting support contained 3.74 wt % of Al and 2.46 wt % of F.

Example 2

Synthesis of Support SII 0.17 mL of a pure solution of Me$_3$SiCl (1.33 mmol) were added on 1.28 g of silica in suspension in toluene (Crossfield ES70X, partially dehydroxylised by heating at a temperature of 450° C. under vacuum). This mixture was heated at a temperature of 110° C. under reflux and stirred during a period of time of 48 hours. The support was then washed three times with toluene and dried under vacuum. 1.15 mL of AlEt$_2$F solution (1.44 mol/L in isopar) were added on the support obtained in suspension in heptane. This mixture was stirred during one hour at a temperature of 20° C., washed three times with heptane, and dried under vacuum. The support was then treated in a fluidised bed under argon and protected from UV radiation according to the following temperature program:
Heated from 30 to 100° C. in one hour;
Heated from 100 to 130° C. in thirty minutes;
Heated from 130 to 300° C. in one hour,
Maintained at a temperature of 300° C. during four hours.
The support was then treated in the same fluidised bed with a 20 mL/min N$_2$O flow, in order to obtain an excess of 160 equivalents versus Al—H, at a temperature of 20° C., during two hours. The resulting support contained 1.28 wt % of Al and 0.71 wt % of F.

Example 3

Synthesis of Support SIII 269 mg of Zr(CH$_2$Ph)$_4$ (0.59 mmol) were dissolved in toluene and added to 1.36 g of silica (Crossfield ES70X, partially dehydroxylized at 450° C. under vacuum). This mixture was stirred during one hour at a temperature of 50° C., washed three times with toluene and dried under vacuum. The support was then treated in a fluidised bed under hydrogen and protected from UV radiation according to the following temperature program:

Heated from 30 to 100° C. in one hour;
Heated from 100 to 130° C. in thirty minutes;
Heated from 130 to 300° C. in one hour;
Maintained at a temperature of 300° C. during four hours The support was then treated in the same fluidised bed with a 20 mL/min $N_2O$ flow, in order to obtain an excess of 240 equivalents versus Zr—H, at a temperature of 20° C., during two hours. The resulting support contained 1.06 wt % of Zr.

The support characteristics are summarised in Table 1.

TABLE 1

| Support | m silica (g) | functionalisation agent (mmol) | equivalent $N_2O$/M-H |
|---|---|---|---|
| SI | 2.02 | 2.6 (AlEt$_2$F) | 80 eq./Al—H |
| SII | 1.28 | 1.33 (Me$_3$SiCl)/0.95 (AlEt$_2$F) | 160 eq./Al—H |
| SIII | 1.36 | 0.59 (Zr[CH$_2$Ph]$_4$) | 240 eq./Zr—H |

Example 4

Copolymerisation of Ethylene and 1-Hexene Using Support SI

To a one litre flask conditioned under argon and containing 300 mL of heptane, 1 mmol/L of tri-isobutylaluminum (TiBA) was added. Support SI was added in the heptane/TiBA mixture, and metallocene catalyst component (ethylene-bis (indenyl)zirconium dichloride [Et(Ind)$_2$ZrCl$_2$] was then added. Several metallocene/support ratios were tested ranging between 0.4 and 2 wt % of metallocene with respect to support. 25 mole % of hexene-1 were added, and the mixture was transferred into a 500 mL Büchi type reactor. Polymerisation was then carried out at a temperature of 80° C. under an ethylene pressure of 3 bars, during a period of time of two hours. After a period of time of two hours and after precipitation in methanol, no trace of polymer was obtained.

Example 5

Copolymerisation of Ethylene and 1-Hexene Using Support SII

The same conditions as those described in example 4 were used with a metallocene/support ratio of 1 wt %. The results are reported in Table 2.

Example 6

Copolymerisation of Ethylene and 1-Hexene Using Support SII

The same conditions as those described in example 4 were used, excepted that activating support SII was pre-contacted with 1.49 mL of a solution of AlEt$_2$F having a concentration of 0.015 mol/L (0.02 mmol) before addition of TiBA. The results are reported in Table 2.

Examples 7 and 8

Copolymerisation of Ethylene and 1-Hexene Using Support SIII

The same conditions as those described in example 4 were used with a metallocene/support ratio of 0.4 wt % for example 7 and of 1 wt % for example 8. The results are reported in Table 2.

Example 9

Synthesis of Support SIb

Support SI was further treated under vacuum according to the following temperature program:
Heated from 30 to 100° C. in one hour;
Heated from 100 to 130° C. in thirty minutes;
Heated from 130 to 300° C. in one hour;
Maintained at a temperature of 300° C. during four hours.

Example 10

Copolymerisation of Ethylene and 1-Hexene Using Support SIb

The same conditions as those described in example 4 were used. After a period of time of two hours and after precipitation in methanol, no trace of polymer was obtained.

TABLE 2

| Example | Support | time min | Et(Ind)$_2$ZrCl$_2$ wt % | Activity g/mol/h | Mw g/mol | PDI | Tm ° C. |
|---|---|---|---|---|---|---|---|
| 5 | SII 46.2 mg | 120 | 1 | $1.48 \cdot 10^5$ (3 g/g) | 116000 | 4.0 | 123 X = 39.1% |
| 6 | SII 89.3 mg | 180 | 1 | $4.01 \cdot 10^5$ (10 g/g) | 138000 | 4.8 | 128 X = 44.6% |
| 7 | SIII 49.9 mg | 180 | 0.4 | $1.23 \cdot 10^6$ (12 g/g) | nd | nd | 126 and 135 |
| 8 | SIII 90.3 mg | 120 | 1 | $4.08 \cdot 10^5$ (10 g/g) | 221000 | 3.9 | 124 and 133 |

Mw, PDI and Tm represent respectively the weight average molecular weight, the polydispersity index and the melting temperature.

The invention claimed is:

1. A process for preparing an activating support that comprises the steps of:
    a) providing a support consisting of particles formed from at least one porous mineral oxide;
    b) dehydroxylating the support of step a) by thermal treatment;
    c) optionally treating the support of step b) with a silane;
    d) functionalizing the support with a solution containing a metallic salt of formula ZrR$_4$ wherein R is hydrocarbyl having from 1 to 20 carbon atoms;
    e) forming supported metal-hydride derivatives by thermal treatment of the support of step d) at a temperature of at least 250° C. under inert gas or by reaction of hydrogen with the support of step d);
    f) oxidizing the support in order to create OH sites by treatment with excess $N_2O$ at room temperature.

2. The process of claim 1 wherein the support is silica and has from 0.25 to 10 OH— radicals per nm² resulted either from a thermal treatment under inert gas at a temperature of from 100 to 1000° C. during at least 60 minutes or from a chemical treatment.

3. The process of claim 1 wherein the dehydroxylating treatment is carried out by thermal treatment at a temperature of from 100 to 1000° C., under inert gas, for a period of time of at least 60 minutes.

4. The process of claim 1 wherein in the functionalizing step carried out with $ZrR_4$, the amount of zirconium is of at most ⅓ that of silanol groups present on the silica surface.

5. The process of claim 1 wherein the formation of metal-hydride derivatives is carried out by heating the support under inert gas at a temperature of from 200 to 600° C. for a period of time from 1 hour to 2 days.

6. The process of claim 1 wherein the formation of metal-hydride derivatives is carried out by heating the support of step d) under hydrogen gas at a temperature of from 200 to 600° C. for a period of time from 1 hour to 2 days.

7. The process of claim 1 wherein the oxidation treatment is carried out under $N_2O$ at a temperature of from 200 to 600° C. for a period of time from 1 hour to 2 days.

8. An activating support obtained by the process of claim 1.

9. A supported metallocene catalyst system for the homo- or co-polymerization of olefins, comprising:
   a) a metallocene catalyst component;
   b) optional an alkylating agent selected from triethylaluminium (TEAL) or triisobutyl aluminium (TIBA); and
   c) the activating solid support of claim 8, wherein the metallocene catalyst component is impregnated on the activating support before or after the optional alkylation treatment.

10. A method for preparing a supported metallocene catalyst system that comprises the steps of:
   a) providing the activating support of claim 8;
   b) dissolving a metallocene catalyst component in an organic solvent;
   c) optionally providing an alkylating agent to alkylate the metallocene component;
   d) impregnating the solution of step b) and optionally the alkylating agent of step c) onto the support either simultaneously or in any order;
   e) retrieving a supported catalyst system.

11. A process for homopolymerizing or copolymerizing olefins that comprises the steps of:
   a) providing the supported metallocene catalyst system of claims 9;
   b) injecting a monomer and an optional comonomer;
   c) maintaining under polymerization conditions;
   d) retrieving a polymer.

12. The process of claim 11 wherein the olefin is ethylene or propylene.

13. The process of claim 1, wherein the silane is $SiMe_3Cl$.

* * * * *